Dec. 30, 1947.    E. G. HAVEN    2,433,665
REGULATOR CIRCUIT
Filed Feb. 1, 1945
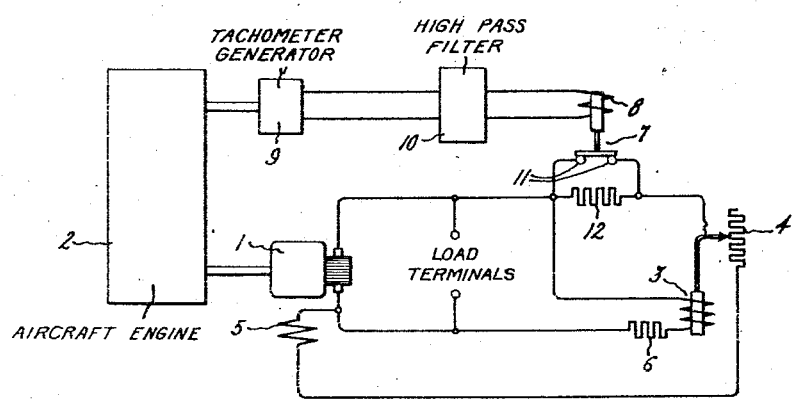
Inventor:
Edward G. Haven,
by Nancy E. Dunham
His Attorney.

Patented Dec. 30, 1947

2,433,665

UNITED STATES PATENT OFFICE 2,433,665

REGULATOR CIRCUIT

Edward G. Haven, Scotia, N. Y., assignor to General Electric Company, a corporation of New York Application February 1, 1945, Serial No. 575,633

3 Claims. (Cl. 322—23)

This invention relates to regulator circuits and more particularly to improvements in automatic voltage regulator circuits for dynamo-electric generators which operate over a wide speed range.

The voltage of most dynamo-electric generators, especially direct-current generators, is usually controlled by varying their field current and most automatic generator voltage regulators include means, such as variable resistances, which automatically control the field current in such a manner as to maintain the generator voltage constant. When the speed of the generator varies over a wide range, it is necessary to vary the field current over a correspondingly wide range in order to maintain constant voltage and this requires that the regulator, and typically its regulating resistance, have a wide operating range. Consequently, many standard automatic regulators which are suitable for controlling the voltage of constant speed generators are not suitable for regulating the voltage of widely variable speed generators.

In accordance with this invention there is provided a novel and simple system which makes it possible to use a standard relatively narrow resistance range automatic voltage regulator with generators having a wide variation in speed. The invention is characterized by the use of supplemental means responsive to the speed of the generator for controlling the excitation of the regulated generator independently of the main voltage regulator. Furthermore, the response of this supplemental means is entirely independent of the electrical condition of the regulated generator so that the system is particularly free of any tendency toward hunting or oscillation which sometimes occurs when field current or field voltage is used for in effect extending the range of an automatic voltage regulator.

An object of the invention is to provide a new and improved regulator circuit.

Another object of the invention is to provide a new and improved automatic voltage regulator circuit for dynamo-electric generators which operate over a wide speed range.

A further object of the invention is to provide an automatic generator voltage regulator system having supplemental generator speed responsive means which is independent of the electrical condition of the generator for effectively increasing the range of an automatic voltage regulator for the generator.

The invention will be better understood from the following description taken in connection with the accompanying drawing and its scope will be pointed out in the appended claims.

Referring now to the single figure of the accompanying drawing, there is illustrated diagrammatically therein an embodiment of the invention applied to a main generator 1 having a relatively wide range of normal operating speeds. For example, this generator may be a direct-current shunt-excited airplane generator which is driven directly from the aircraft engine which is indicated schematically at 2. The voltage of the generator 1 is automatically maintained at a substantially constant value by means of a standard generator voltage regulator of any suitable type, such as a direct-acting rheostatic regulator having a main control coil 3 connected across the output terminals of the generator and a variable resistance or rheostatic element 4 connected in series with a shunt field winding 5 across the generator's output terminals. The customary swamping resistor 6 is connected in series with the main control coil 3 for rendering the response of this coil substantially independent of temperature variations. Thus, the swamping resistor has a materially higher resistance than the resistance of the coil 3, and it has a substantially zero temperature coefficient of resistance so that the over-all resistance change of the circuit including the coil 3 with changes in temperature is negligible.

By reason of the wide range of speeds over which the generator 1 may be operated the range of resistance of the rheostatic element 4 will not be sufficiently great to maintain the generator voltage constant throughout its normal range of operating speeds. This is corrected by means of a voltage relay 7 which is arranged to be actuated in accordance with the speed of the main generator. This is accomplished by connecting the operating coil 8 of the relay across the terminals of a tachometer alternator 9 for the engine 2 through a high pass filter indicated schematically at 10. The frequency of the alternating-current generated by the tachometer alternator 9 is directly proportional to the speed of the main engine and consequently is directly proportional to the speed of the main generator 1, and the high pass filter 10 is so tuned or proportioned that at a predetermined frequency the voltage on the operating coil 8 of the regulating relay will increase rapidly, thus causing this relay to pick up and open a set of normally closed contacts 11 which are connected across a fixed resistor 12 which is in series with the rheostatic element 4 in the shunt field circuit of the main regulated generator.

The operation of the illustrated embodiment of the invention is as follows: When the speed of the main generator rises to such a value that substantially all of the resistance of the rheostatic element 4 is inserted in the shunt field circuit of the main generator the voltage relay 7 picks up, thus in effect inserting the fixed resistance 12 in the shunt field circuit of the main regulated generator. Consequently, the automatic voltage regulator can now in effect back off and reduce the resistance value of its rheostatic element with the result that the speed can be still further increased without permitting the voltage to increase because the voltage regulator will now have a further margin of resistance for regulating the voltage.

Similarly, when the speed falls and the automatic voltage regulator has cut out substantially all of its resistance the voltage relay will drop out, thus short circuiting the fixed resistance 12 and further reducing the resistance in the field circuit of the regulated generator. The normal difference between the pick-up and drop-out energization values of relay 8 will prevent a pumping action of the relay.

It will be noted that the energization of the voltage relay 7 is not responsive to any electrical condition of the main generator, such as its field current or field voltage, and that its operating coil 8 is not electrically connected to any part of the main generator. Consequently, the change in electrical conditions in the main generator resulting from the picking up or dropping out of the voltage relay will have no effect whatsoever on the energization of this relay and consequently hunting of the system is effectively eliminated.

While there has been shown and described a particular embodiment of this invention, it will be obvious to those skilled in the art that various changes and modification can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a direct-current generator, a tachometer alternator, an aircraft engine for driving said generator and said alternator at widely varying speeds, a shunt field circuit for said generator, a pair of serially-connected resistors in said shunt field circuit, resonating means responsive to the frequency of said alternator for increasing the effective value of one of said resistors in at least one step when the frequency increases above a predetermined value and for decreasing the effective value of said one resistor in at least one step when the frequency decreases below a predetermined value, and means responsive to the voltage of said generator for varying the effective value of the other resistor so as to maintain constant the voltage of said generator over its normal operating variations of speed and load.

2. In combination, a dynamo-electric generator having a shunt field winding and adapted for operation over a widely variable range of operating speeds, a variable resistance in said shunt field circuit, generator voltage responsive means for adjusting said variable resistance, a second resistance, and switching means responsive to generator speed and independent of generator voltage for inserting said second resistance in said shunt field circuit.

3. In combination, a dynamo-electric generator having a shunt field winding circuit and adapted for operation over a wide speed range, variable resistance voltage regulating means connected in said shunt field winding circuit and connected to be responsive to the voltage of said generator, an additional resistance element connected in said shunt field winding circuit, electromagnetic means for controlling the value of said additional resistance element included in said shunt field winding circuit, and means responsive to the speed of said generator for controlling the energizing of said electromagnetic means above a predetermined generator speed to effect an increase in the value of the resistance element included in said shunt field winding circuit.

EDWARD G. HAVEN.

REFERENCES CITED

The following references are of record in the file of this patent:

UNITED STATES PATENTS

| Number | Name | Date |
|---|---|---|
| 1,789,145 | Livingston | Jan. 13, 1931 |
| 1,894,810 | Winter | Jan. 17, 1933 |

FOREIGN PATENTS

| Number | Country | Date |
|---|---|---|
| 353,893 | Great Britain | July 22, 1931 |